(12) United States Patent
Kawata (10) Patent No.: US 9,561,887 B2
(45) Date of Patent: Feb. 7, 2017

(54) HOPPER AND MEDICINE SUPPLY APPARATUS INCLUDING THE SAME

(75) Inventor: Kenji Kawata, Hirakata (JP)

(73) Assignee: Takazono Technology Incorporated, Hirakata-shi, Osaka (JP)

( * ) Notice: Subject to any disclaimer, the term of this patent is extended or adjusted under 35 U.S.C. 154(b) by 0 days.

(21) Appl. No.: 13/820,307

(22) PCT Filed: Sep. 1, 2011

(86) PCT No.: PCT/JP2011/069906
§ 371 (c)(1),
(2), (4) Date: Mar. 1, 2013

(87) PCT Pub. No.: WO2012/029907
PCT Pub. Date: Mar. 8, 2012

(65) Prior Publication Data
US 2013/0161355 A1    Jun. 27, 2013

(30) Foreign Application Priority Data

Sep. 3, 2010  (JP) .................................. 2010-197382

(51) Int. Cl.
*B65D 83/00* (2006.01)
*B65D 47/06* (2006.01)
(Continued)

(52) U.S. Cl.
CPC ............. *B65D 47/06* (2013.01); *B65B 39/007* (2013.01); *G07F 17/0092* (2013.01);
(Continued)

(58) Field of Classification Search
CPC ....... B65D 88/66; B65D 33/007; B65D 88/54; B65D 83/00; B65D 83/0055; B65D 83/0436; B65D 83/06; B65D 83/0094; B65G 47/19; B65G 65/40; G01G 13/024; G01G 17/06; B67D 3/00; G01F 11/08; G01F 11/088
(Continued)

(56) References Cited

U.S. PATENT DOCUMENTS

| 920,250 A | * | 5/1909 | Blakeslee | ................. B65B 3/12 141/190 |
| 1,809,091 A | * | 6/1931 | Wiken | ...................... B65B 1/42 222/529 |

(Continued)

FOREIGN PATENT DOCUMENTS

| CN | 2595663 Y | 12/2003 |
| CN | 1532117 A | 9/2004 |

(Continued)

OTHER PUBLICATIONS

Notification of the Fourth Office Action for the Chinese Patent Application No. 201180042328.4, The Intellectual Property Office of the People's Republic of China, Jun. 30, 2015.
(Continued)

*Primary Examiner* — Paul R Durand
*Assistant Examiner* — Andrew P Bainbridge
(74) *Attorney, Agent, or Firm* — The Webb Law Firm (57) ABSTRACT

A hopper having a passage through which a medicine can be passed downward is provided. A part of a lower portion of the hopper is a deformable portion having flexibility, and the deformable portion is deformable so as to open and close the passage. According to this configuration, the deformable portion that is a part of the hopper is deformed to open and close the passage. Thus, there is no portion such as an opening and closing plate on which the medicine remains, thereby preventing a gap in which the medicine remains from being formed in the hopper, and preventing the medicine from easily remaining in the hopper.

12 Claims, 4 Drawing Sheets

(51) Int. Cl.
| | |
|---|---|
| *B65B 39/00* | (2006.01) |
| *G07F 17/00* | (2006.01) |
| *B65D 83/06* | (2006.01) |
| *B67D 3/00* | (2006.01) |
| *B65G 47/19* | (2006.01) |
| *G01F 11/08* | (2006.01) |
| *B65D 88/66* | (2006.01) |
| *B65D 88/54* | (2006.01) |
| *B65G 65/40* | (2006.01) |
| *G01G 13/02* | (2006.01) |
| *B65D 83/04* | (2006.01) |
| *B65D 33/00* | (2006.01) |
| *G01G 17/06* | (2006.01) |

(52) U.S. Cl.
CPC ............ *B65D 33/007* (2013.01); *B65D 83/00* (2013.01); *B65D 83/0055* (2013.01); *B65D 83/0094* (2013.01); *B65D 83/0436* (2013.01); *B65D 83/06* (2013.01); *B65D 88/54* (2013.01); *B65D 88/66* (2013.01); *B65G 47/19* (2013.01); *B65G 65/40* (2013.01); *B67D 3/00* (2013.01); *G01F 11/08* (2013.01); *G01F 11/088* (2013.01); *G01G 13/024* (2013.01); *G01G 17/06* (2013.01)

(58) Field of Classification Search
USPC ................. 417/480; 222/196, 200, 202–203, 222/460–462, 232, 181.1, 185.1, 526–537, 222/198–199, 408.5; 141/331, 141/337, 344–345, 314–315; 53/568–569
See application file for complete search history.

(56) References Cited

U.S. PATENT DOCUMENTS

| | | | | | |
|---|---|---|---|---|---|
| 2,689,530 | A | * | 9/1954 | Harvey | F04B 43/082 222/214 |
| 2,770,439 | A | * | 11/1956 | Stafford et al. | 177/73 |
| 2,865,537 | A | * | 12/1958 | Jackson | A47L 15/44 222/214 |
| 3,308,898 | A | * | 3/1967 | Allen | B65B 39/001 177/113 |
| 3,556,352 | A | * | 1/1971 | Roberts | B65D 90/56 222/203 |
| 3,746,057 | A | | 7/1973 | Titchenal | |
| 3,841,535 | A | * | 10/1974 | Taupin | 222/502 |
| 4,305,242 | A | * | 12/1981 | Barathe et al. | 53/512 |
| 4,383,765 | A | | 5/1983 | Gurries | |
| 4,526,214 | A | * | 7/1985 | McGregor | B65B 1/28 141/114 |
| 4,545,509 | A | | 10/1985 | Musschoot et al. | |
| 4,654,878 | A | * | 3/1987 | Lems | 383/37 |
| 5,127,483 | A | | 7/1992 | Hough | |
| 5,437,393 | A | * | 8/1995 | Blicher et al. | 222/77 |
| 5,481,855 | A | * | 1/1996 | Yuyama | B65B 1/06 53/168 |
| 5,651,479 | A | | 7/1997 | Bates | |
| 5,697,523 | A | * | 12/1997 | Brandauer | B65D 90/56 141/248 |
| 5,735,439 | A | | 4/1998 | Heinrici et al. | |
| 5,769,281 | A | | 6/1998 | Bates | |
| 5,960,990 | A | * | 10/1999 | Radosevich | 222/1 |
| 6,011,223 | A | * | 1/2000 | Poller | B65D 90/56 177/105 |
| 6,253,968 | B1 | * | 7/2001 | Van Dijk et al. | 222/241 |
| 6,283,178 | B1 | * | 9/2001 | Way | 141/316 |
| 6,647,702 | B1 | * | 11/2003 | Kim | 53/568 |
| 6,786,367 | B2 | * | 9/2004 | Schlosser | 222/478 |
| 7,118,010 | B2 | * | 10/2006 | Crowder et al. | 222/1 |
| 7,475,793 | B2 | | 1/2009 | Wahl | |
| 7,677,411 | B2 | | 3/2010 | Crowder et al. | |
| 2007/0170207 | A1 | * | 7/2007 | Kraus et al. | 222/199 |
| 2008/0017669 | A1 | | 1/2008 | MacMichael et al. | |
| 2009/0159153 | A1 | | 6/2009 | Luechinger | |

FOREIGN PATENT DOCUMENTS

| | | |
|---|---|---|
| CN | 101464182 A | 6/2009 |
| DE | 320137 | 4/1920 |
| DE | 3838542 A1 | 5/1990 |
| DE | 202007003535 U1 | 7/2007 |
| GB | 1300063 | 12/1972 |
| JP | 52168749 | 12/1977 |
| JP | 54182268 | 12/1979 |
| JP | 1134096 U | 9/1989 |
| JP | 5162701 A | 6/1993 |
| JP | 7300101 A | 11/1995 |
| JP | 11248522 A | 9/1999 |
| JP | 2000-326901 A | 11/2000 |
| JP | 200280001 A | 3/2002 |
| JP | 2002370714 A | 12/2002 |
| JP | 200529294 A | 2/2005 |
| JP | 2005110786 A | 4/2005 |
| JP | 2005536415 A | 12/2005 |
| JP | 2006110107 A | 4/2006 |
| JP | 2006151416 A | 6/2006 |
| JP | 2008504179 A | 2/2008 |
| JP | 2008094496 A | 4/2008 |
| JP | 200940506 A | 2/2009 |
| NL | 1019784 C2 | 7/2003 |
| WO | 2008041538 A1 | 4/2008 |
| WO | 2008120657 A1 | 10/2008 |

OTHER PUBLICATIONS

European Office Action, dated Dec. 22, 2015, in related European Patent Application No. 11821923.7.

Office Action issued by Japanese Patent Office re Japanese Patent Application No. 2010-197382.

\* cited by examiner

HOPPER AND MEDICINE SUPPLY APPARATUS INCLUDING THE SAME

TECHNICAL FIELD

The present invention relates to a hopper having a passage through which a medicine can be passed downward, and a medicine supply apparatus including the hopper.

BACKGROUND ART

A medicine dispensing and packing apparatus mounts therein a medicine supply apparatus. The medicine supply apparatus includes a hopper. The hopper has a passage through which a flowable medicine such as a powder medicine or a pill can be passed downward (for example, Patent Document 1).

The hopper described in Patent Document 1 includes a supply container that can once store a supplied medicine such as a powder medicine. A lower end of the supply container is open. The supply container includes an opening and closing plate, which can close or open an open portion, supported by a hinge. The medicine can be taken out from the supply container by moving the opening and closing plate.

CITATION LIST

Patent Document

Patent Document 1: Japanese Patent Laid-Open No. 2005-110786

SUMMARY OF INVENTION

Technical Problem

However, in the hopper including the opening and closing plate, the opening and closing plate is located in contact with the medicine. Thus, the medicine easily remains on a surface of the opening and closing plate, and a gap or uneven portions in a hinge portion or the like of the opening and closing plate. When a medicine to be supplied to the hopper is changed to a medicine of a different type, a remaining medicine needs to be removed from the hopper in order to avoid contamination. In this case, it is troublesome to clean the hopper including the opening and closing plate, and a gap or uneven portions.

Therefore, it is an object of the present invention to provide a hopper in which a medicine is prevented from easily remaining, and a medicine supply apparatus including the hopper.

Solution to Problem

According to the first invention, there is provided a hopper having a passage through which a medicine can be passed downward, wherein a part of a lower portion of the hopper is a deformable portion having flexibility, and the deformable portion is deformable so as to open and close the passage.

According to this configuration, the deformable portion that is a part of the hopper is deformed to open and close the passage. This prevents a gap in which a medicine remains from being formed in the hopper.

In the first invention, the deformable portion is preferably made of rubber.

According to this configuration, the deformable portion can be easily formed using the rubber.

In the first invention, the deformable portion may include a lock portion for deforming the deformable portion in a direction of opening the passage.

According to this configuration, the lock portion can be used to easily open the passage.

According to a second invention, there is provided a medicine supply apparatus including a hopper having a passage through which a medicine can be passed downward, wherein a part of a lower portion of the hopper is a deformable portion having flexibility, the deformable portion is deformable so as to open and close the passage, and the medicine supply apparatus further includes an opening and closing portion that deforms the deformable portion to open and close the passage.

According to this configuration, the opening and closing portion deforms the deformable portion that is a part of the hopper to open and close the passage. This prevents a gap in which a medicine remains from being formed in the hopper in the medicine supply apparatus.

In the second invention, it is preferable that the opening and closing portion include a pair of pressing portions that can hold the deformable portion of the hopper through one side and the other side of the deformable portion, and a portion facing the deformable portion of at least one of the pair of pressing portions is elastic.

According to this configuration, the portion facing the deformable portion of at least one of the pair of pressing portions is elastic. This can reliably close the deformable portion.

In the second invention, it is preferable that each of the pair of pressing portions extends in a direction crossing a vertical direction so as to cross the deformable portion, and a portion in the elastic portion closer to a center portion in an extending direction of the pressing portion is more elastic than a portion closer to at least one of the opposite ends in the same direction.

According to this configuration, the portion in the elastic portion closer to the center portion in the extending direction of each pressing portion is more elastic than a portion closer to at least one of the opposite ends in the same direction. Thus, the portion closer in the elastic portion to one end can more strongly press the deformable portion.

In the second invention, the pressing portion may be located above a lower end of the hopper.

According to this configuration, the pressing portion is located above the lower end of the hopper. This prevents the medicine from adhering to the pressing portion.

In the second invention, the medicine supply apparatus may further include a hopper holder that holds the hopper, wherein the hopper holder includes a vibrator that vibrates the hopper.

According to this configuration, the hopper holder includes the vibrator that vibrates the hopper. Thus, even if the medicine remains in the hopper, the medicine can be shaken off by vibration.

Advantageous Effect of Invention

According to the present invention, a gap in which a medicine remains is prevented from being formed in the passage of the hopper. Thus, the present invention can provide a hopper in which a medicine is prevented from easily remaining, and a medicine supply apparatus including the hopper.

BRIEF DESCRIPTION OF DRAWINGS

FIG. 4 is a schematic sectional view along a pressing portion, showing an opening and closing state of a deformable portion by the opening and closing portion in the embodiment of the present invention.

DESCRIPTION OF EMBODIMENT

Figure 2:
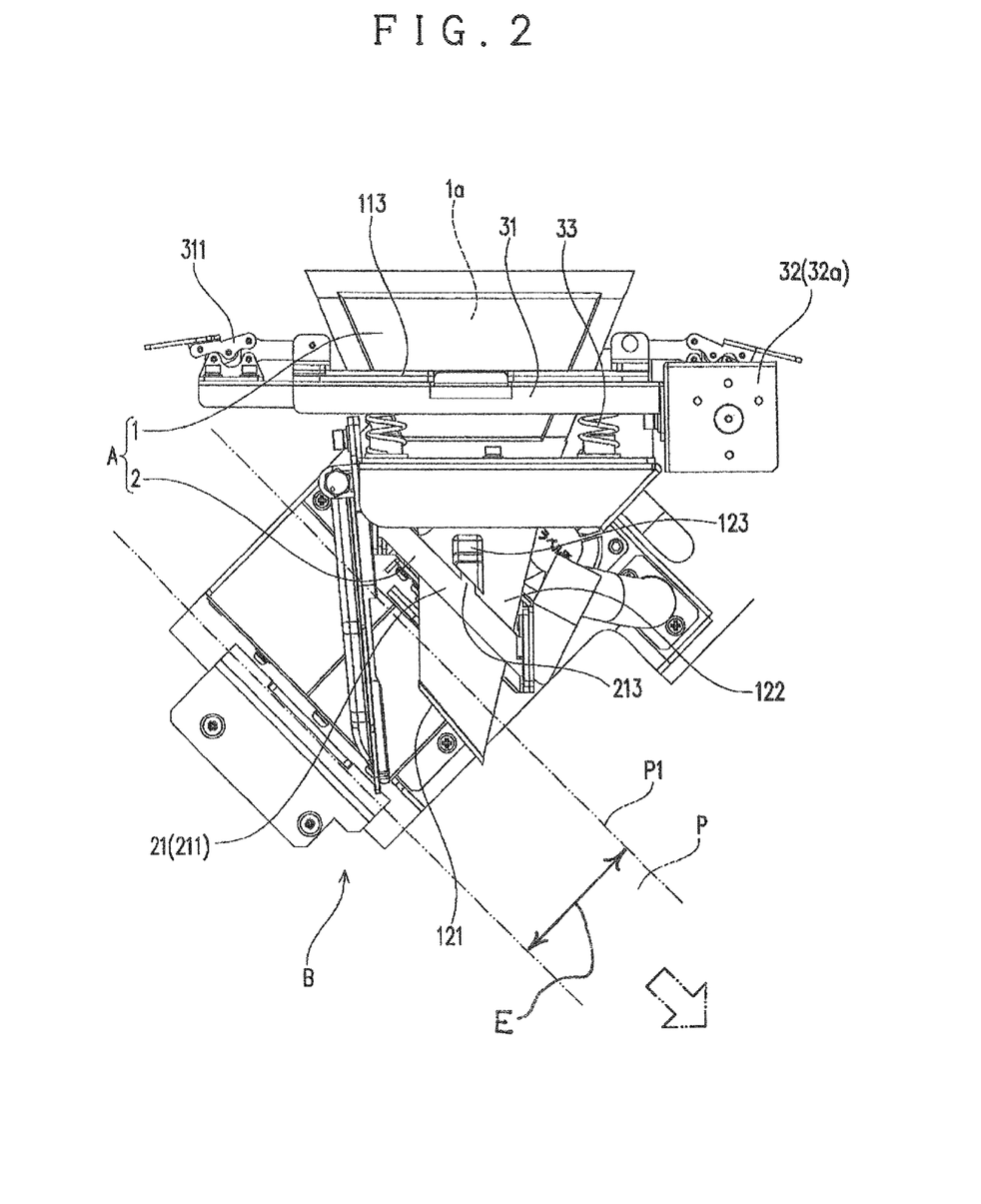
FIG. 2 is a front view of essential portions of the medicine dispensing and packing apparatus to which the hopper according to the embodiment of the present invention is mounted.

Now, an embodiment of the present invention will be described. First, a hopper 1 will be described. The hopper 1 and an opening and closing portion 2 described later constitute a medicine supply apparatus A. As shown in FIG. 2, the medicine supply apparatus A is combined with a dispensing and packing apparatus B to constitute a medicine dispensing and packing apparatus.

—Configuration of Hopper—

Figure 1:
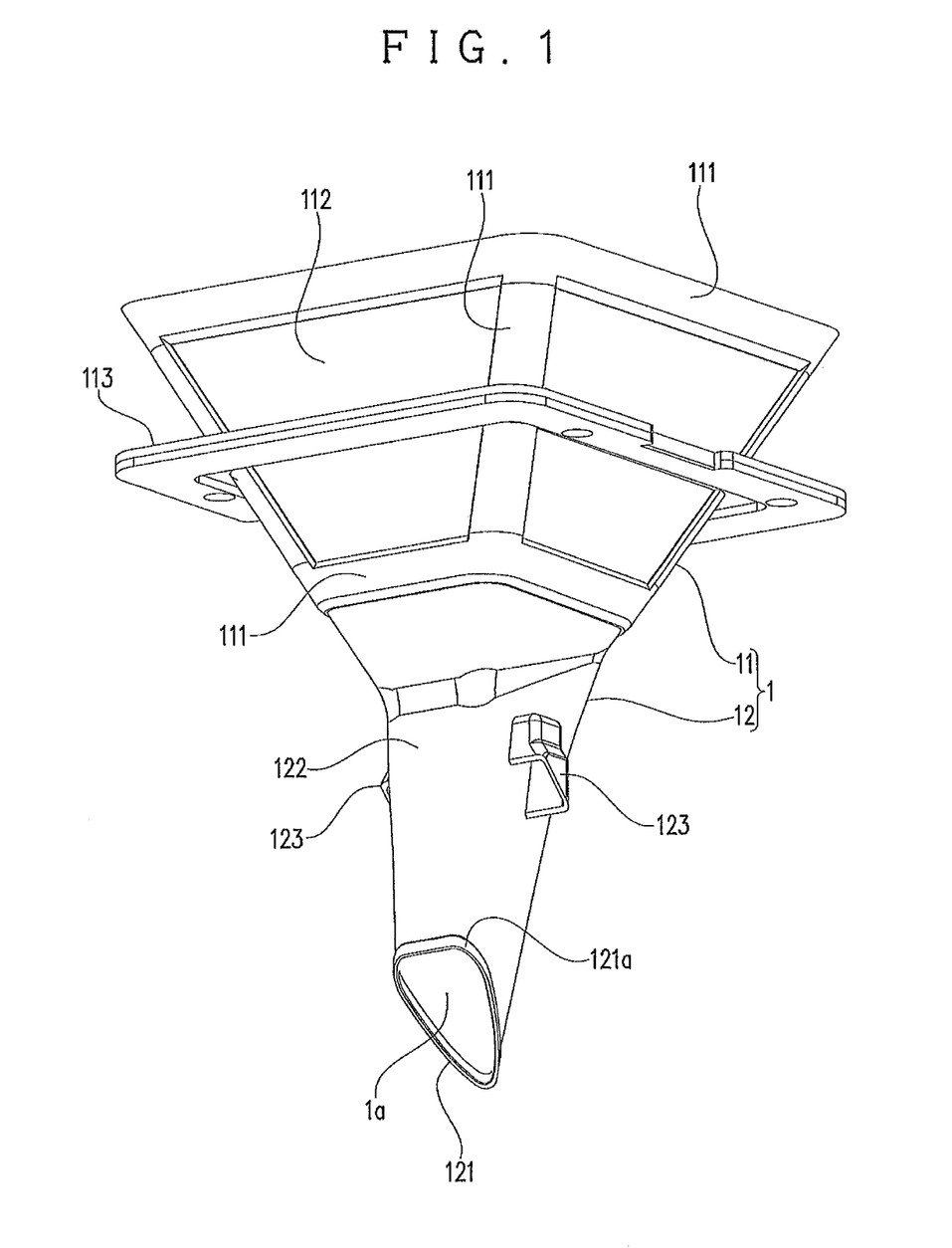
FIG. 1 is a perspective view of a hopper according to an embodiment of the present invention seen from a bottom side.

The hopper 1 of this embodiment has a shape as shown in FIG. 1, and has a passage 1a through which a medicine can be passed downward. In the medicine dispensing and packing apparatus, the hopper 1 is mounted so that the passage 1a is vertically oriented. The hopper 1 includes a hopper body 11 and a nozzle 12. The hopper body 11 is an upper part of the hopper 1. The hopper body 11 can store a medicine therein. The nozzle 12 is located below the hopper body 11. A lower end of the nozzle 12 is a medicine output port 121. The medicine stored in the hopper body 11 can be taken out from the medicine output port 121. The passage 1a has a smaller lateral cross sectional area in the nozzle 12 than in the hopper body 11 so that the medicine can be taken out. In a space through which the medicine passes in the passage 1a, no member is provided that constitutes an opening and closing mechanism for opening and closing the passage 1a (for example, an opening and closing plate or a hinge).

In this embodiment, the hopper 1 is made of rubber (more specifically, silicon rubber), and the hopper 1 is entirely integrally formed. The hopper 1 can be thus integrally formed without a joint or a step in an inner surface of the hopper 1, thereby preventing the medicine from easily remaining on the inner surface. In addition, no member is provided that constitutes an opening and closing mechanism in the space through which the medicine passes in the passage 1a as described above. Thus, in the hopper 1 of this embodiment, a path through which the medicine passes does not include a portion on which the medicine may remain. Thus, the medicine is prevented from remaining in the entire hopper 1. However, the present invention is not limited to the hopper 1 integrally formed, but separate members may be combined to form the hopper 1. In a case where separate members are combined to form the hopper 1, as described later, a deformable portion 122 needs to be made of a deformable material, but other portions may be made of various materials. The materials include, for example, metal, hard resin, or paper. The deformable portion 122 may be made of a deformable material such as paper or a resin sheet, not limited to rubber.

In the hopper 1 of this embodiment, no means is provided that is separate from the hopper 1 and can close or open the passage 1a as the opening and closing plate in the hopper described in Patent Document 1. The hopper 1 of this embodiment includes the deformable portion 122 for opening and closing the passage 1a. The medicine supply apparatus A includes the opening and closing portion 2 for deforming the deformable portion 122. The deformable portion 122 and the opening and closing portion 2 will be described later.

The inner surface of the hopper 1 of this embodiment is subjected to surface treatment to reduce friction between the inner surface and the medicine passing through the passage 1a. This prevents the medicine from easily remaining on the inner surface of the hopper 1. The surface treatment is a coating of a material different from a material of the hopper 1 (for example, resin coating) in this embodiment. Alternatively, the surface treatment may be chemical treatment by melting the inner surface using a chemical agent or the like, or physical treatment by sandblasting of the inner surface as long as friction between the inner surface and the medicine can be reduced.

—Hopper Body—

The hopper body 11 has a trumpet or funnel shape spreading upward, and has a substantially square lateral cross sectional shape in this embodiment. The hopper body 11 includes a relatively thick and rigid frame 111 formed in outer edges and four corners, and relatively thin and less rigid flat plate portions 112 surrounded by the frame 111. The frame 111 is provided to retain the shape. More specifically, the frame 111 is provided to prevent the hopper 1 from being deformed by a self-weight of the hopper 1, and a weight and drop pressure of the medicine passing through the passage 1a. The flat plate portion 112 has relatively lower rigidity in order to save materials and also for a vibrator 32 described later to vibrate the hopper 1 and ripple the inner surface of the flat plate portion 112 to shake off a remaining medicine.

In the hopper body 11, a plate-like holder mounting portion 113 protrudes from an outer surface. The holder mounting portion 113 is used to secure the hopper 1 to the medicine supply apparatus A. In this embodiment, the holder mounting portion 113 horizontally protrudes from the hopper body 11 along its entire circumference, but may have various shapes as long as it can secure the hopper 1.

—Nozzle—

The nozzle 12 is provided to be continuous with the lower end of the hopper body 11 with a lateral cross sectional area of the passage 1a decreasing downward. The lower end of the nozzle 12 is opened to act as the medicine output port 121. The lower end is diagonally cut so that, as shown in FIG. 2, the medicine output port 121 in the medicine dispensing and packing apparatus is substantially parallel to a side end P1 of a packing paper P center-folded in a width direction, and conveyance of the packing paper P is not prevented. A lower edge 121a around the medicine output port 121 has a larger thickness than other portions of the nozzle 12. This ensures a shape retaining property at a lower end of the nozzle 12.

Deformable Portion

In this embodiment, the hopper 1 is integrally formed of silicon rubber, and thus the nozzle 12 is naturally made of silicon rubber. Thus, the entire nozzle 12 acts as the deformable portion 122 having flexibility, and the deformable portion 122 is deformable so as to open and close the passage 1a. The passage 1a is opened and closed by the opening and closing portion 2 described later. The deformable portion 122 is desirably made of an elastic material that is resiliently deformable and that can maintain flexibility and also a shape restoring property over a long period in terms of economy. The deformable portion 122 allows the medicine to be once stored in the hopper 1. In the case where separate members are combined to form the hopper 1, only a part of the nozzle 12 rather than the entire nozzle 12 may be the deformable portion 122.

The wording "opening and closing" may include three meanings: (1) the passage 1a is forcedly opened and closed, (2) the passage 1a is forcedly closed and naturally opened by an elastic force or the like of the deformable portion 122, and (3) the passage 1a is forcedly opened and naturally closed by the elastic force or the like of the deformable portion 122. A case where the passage 1a is kept half opened or half closed is also included. Thus, the aspect in which the passage 1a is closed is not limited to the passage 1a being fully closed, but includes the passage 1a being closed with an opening such that the medicine cannot be taken out. On the other hand, an aspect in which the passage 1a is opened has the passage 1a being slightly opened so that the medicine can substantially pass through. Even in the case where the passage 1a is half opened as described above, the passage 1a in the nozzle 12 has a decreasing lateral cross sectional area, and a dropping medicine hits the inner surface of the nozzle 12, thereby reducing a dropping speed of the medicine. This can prevent the medicine having dropped on the packing paper P centerfolded in the width direction from rebounding upward and flying (referred to as "blowout").

In this embodiment, the passage 1a in the deformable portion 122 is configured to be opened when no external force is applied to the deformable portion 122, and forcedly closed by the opening and closing portion 2 described later. On the contrary, the deformable portion 122 may be configured so that the passage 1a is closed when no external force is applied to the deformable portion 122, and opened by the opening and closing portion 2.

A lateral cross sectional shape of the deformable portion 122 includes at least one short side and two long sides adjacent to the short side. In this embodiment, an upper portion of the nozzle 12 has a rounded square shape matching the shape of the hopper body 11, a middle portion has a rounded rectangular shape with two short sides and two long sides, and a lower portion has a rounded isosceles triangular shape with one short side and two long sides, as shown in FIG. 1.

The deformable portion 122 is deformed by the opening and closing portion 2 described later so that the long sides described above move close to or away from each other. At this time, the short side in the lateral cross sectional shape is bent. Specifically, an inner surface of the deformable portion 122 can be widened or narrowed to pass the medicine downward, or stop the medicine in a position above the opening and closing portion 2 (more specifically, a pressing portion 211) of the hopper 1. As such, the passage 1a can be opened and closed only by deformation of the deformable portion 122, and thus there is no need to provide means separate from the hopper 1 such as the opening and closing plate described in Patent Document 1 in a position in contact with the medicine passing through the passage 1a. Thus, the medicine is prevented from easily remaining in the hopper 1, and the hopper 1 can be easily cleaned. Also, since a structure of the hopper 1 can be simplified, the hopper may be ultimately disposable without the need to clean the hopper 1.

—Lock Portion—

The deformable portion 122 includes a lock portion 123 on an outer surface. The lock portion 123 is used for deforming the deformable portion 122 in a direction of opening the passage 1a. As shown in FIG. 1, the deformable portion 122 in this embodiment has a pocket shape opening downward on the outer surface of each long side of the deformable portion 122. As shown in FIG. 2, when the hopper 1 is mounted to the medicine dispensing and packing apparatus, a hanging portion 213 (described later) on an opening and closing operation portion 21 is inserted into the pocket-shaped lock portion 123. The opening and closing operation portion 21 can be operated to open the passage 1a in the deformable portion 122.

The lock portion 123 may lock the opening and closing operation portion 21 so that the deformable portion 122 operates in association with the operation of the opening and closing operation portion 21, using various means such as bonding, clasping, or fitting. In this embodiment, the lock portion 123 has a pocket shape, and in removal of the hopper 1, the hanging portion 213 on the opening and closing operation portion 21 is unlocked from the lock portion 123 by simply moving the hopper 1 upward. This facilitates removal of the hopper 1, and thus facilitates cleaning of the hopper 1. In some cases, the lock portion 123 may be provided in the nozzle 12.

Medicine Supply Apparatus and Medicine Dispensing and Packing Apparatus

Next, the medicine supply apparatus A and the medicine dispensing and packing apparatus will be described. The medicine supply apparatus A includes the hopper 1, and the opening and closing portion 2 that opens and closes the passage 1a so that a predetermined amount of medicine can be taken out. The medicine dispensing and packing apparatus includes the medicine supply apparatus A, and a dispensing and packing apparatus B for packing the medicine supplied by the medicine supply apparatus A using the packing paper P. The dispensing and packing apparatus B center-folds, in a width direction, the packing paper P continuously supplied in a length direction, packs a medicine for one pack supplied from a medicine supply container with the packing paper P, and then bonding a circumference of the packing paper P by heat sealing or the like. Essential portions of the medicine dispensing and packing apparatus are shown in FIG. 2. The packing paper P center-folded in the width direction is shown by chain double-dashed lines defining an envelope E. A moving direction of the packing paper P is as indicated by an arrow in the Figure.

As shown in the Figure, the lower end of the nozzle 12 in the hopper 1 is located inside the envelope E defined by the center-folded packing paper P. An end surface shape of the medicine output port 121 is an isosceles triangle as shown in FIG. 1, and an apex of the shape is located on a downstream side in the moving direction of the packing paper P.

Opening and Closing Operation Portion

Figure 3:
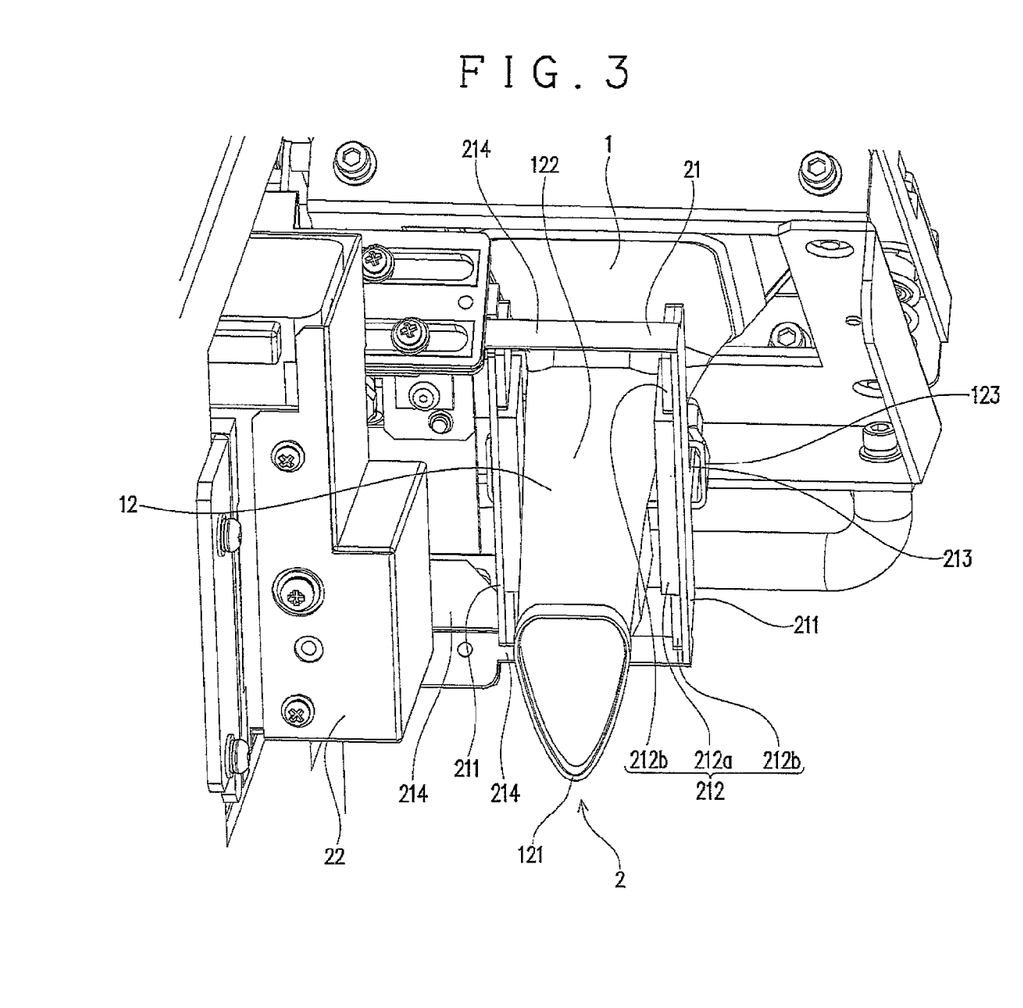
FIG. 3 is a side view of essential portions around an opening and closing portion in the medicine dispensing and packing apparatus to which the hopper according to the embodiment of the present invention is mounted.

As shown in FIG. 3, the opening and closing portion 2 includes a pair of opposing opening and closing operation portions 21 that can hold the deformable portion 122 in the nozzle 12 of the hopper 1 from one side and the other side, and a driving portion 22 for driving the opening and closing operation portions 21. Each of the opening and closing operation portions 21 is made of metal and has a rectangular sectional shape with one side removed. The opening and closing operation portion 21 includes pressing portions 211 that each have an elongated plate shape and can come close to each other to press the deformable portion 122, and coupling portions 214 extending from opposite ends of the pressing portions 211 to the driving portion 22. The pressing portions 211, 211 extend diagonally (that is, in a direction crossing a vertical direction so as to cross the deformable portion 122 on side view). The pressing portions 211 and 211 are parallel to each other with the deformable portion 122 therebetween. As shown in FIG. 2, the pressing portions 211, 211 are provided in parallel with the lateral side of the packing paper P on an outside of the packing paper P moving in the medicine dispensing and packing apparatus.

The pressing portions 211, 211 are provided on the outside of the packing paper P because if the pressing portions 211, 211 are located within lines (a range of the chain double-dashed lines in FIG. 2) of the packing paper P, timing when a paper holder (not shown) for holding the packing paper P on a downstream side of the nozzle 12 holds the packing paper P matches timing when the opening and closing portion 2 opens the deformable portion 12 (that is, the pressing portions 211, 211 apply opposite forces to the packing paper P), thereby causing a tear of the packing paper P. Further, if the pressing portions 211, 211 are located within the lines of the packing paper P, the medicine may adhere to the pressing portions 211, 211.

Figure 4A:
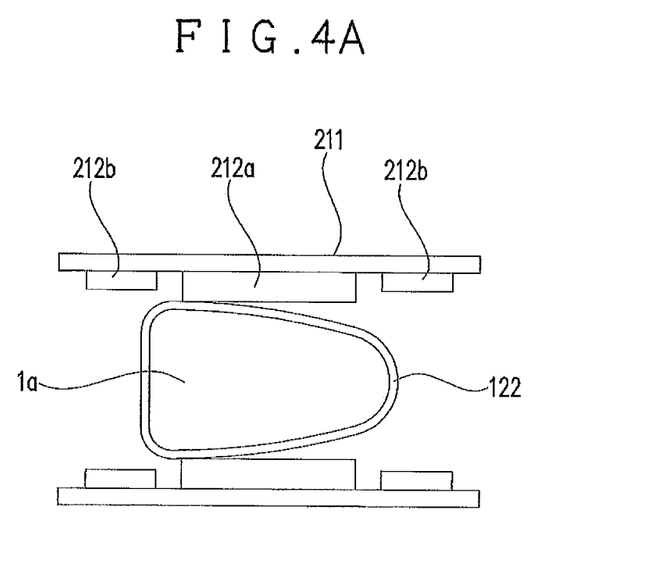
FIG. 4A shows an opened state.

The opening and closing operation portion 21 is provided above the lower end of the hopper 1. Thus, a positional relationship between the opening and closing operation portion 21 and the passage 1a is as shown in FIG. 4(A). Thus, the opening and closing operation portion 21 is separated from the medicine passing through the passage 1a by the hopper 1, and the medicine does not remain around the opening and closing operation portion 21. The opening and closing operation portion 21 is provided as close as possible to the lower end of the hopper 1 so as to reduce a dropping distance of the medicine, and prevent "blowout" of the medicine.

In this embodiment, the driving portion 22 is provided on a lateral side of the nozzle 12. The opening and closing operation portion 21 on a right side in the Figure is moved to left in the Figure when the passage 1a of the hopper 1 is closed, and the opening and closing operation portion 21 on a left side in the Figure is moved to right in the Figure when the passage 1a of the hopper 1 is closed. The driving portion 22 is driven by a motor, and meshing of gear (not shown) moves the coupling portions 214 to left and right in the Figure. During the movement, the pressing portions 211, 211 are kept in parallel with each other.

The shape and the operation of the pressing portion 211 are not limited to those in this embodiment, but may be changed in various manners. For example, the pressing portion 211 includes a cantilevered pressing portion, a pressing portion by cylinder driving, and a pressing portion having a hinge at one end and pivotally moved. In short, the pressing portion 211 may be changed in any manners as long as it moves relative to the deformable portion 122, and can deform the deformable portion 122 so as to open and close the passage 1a. Only an operation in a pressing direction (direction approaching the deformable portion 122) may be performed by the driving portion 22, and an operation in an opposite direction may be performed by repulsion of a spring or the like (rather than by the driving portion 22).

In a case where the deformable portion 122 of the hopper 1 is configured to be closed when an external force is not applied to the passage 1a, and opened by the opening and closing portion 2, for example, only a hanging portion 213 described later may be provided to open the passage 1a without providing the pressing portion 211 in the opening and closing operation portion 21.

—Cushioning Portion—

Each of the pressing portions 211, 211 in this embodiment includes an elastic cushioning portion 212 on an inner surface (that is, a portion facing the deformable portion 122 of the hopper 1). The cushioning portion 212 can absorb unevenness in thickness of the deformable portion 122 due to a formation error of the hopper 1. Specifically, if the pressing portions 211, 211 that are made of metal and are not elastic as in this embodiment directly press the deformable portion 122 when the deformable portion 122 has an uneven thickness over the entire circumference, it is difficult to achieve close contact of the deformable portion 122 to fully close the passage 1a. Thus, the cushioning portion 212 can press a portion with a smaller thickness in the deformable portion 122 with a relatively large force. The cushioning portion 212 can press a portion with a larger thickness in the deformable portion 122 with a relatively small force. This can fully close the passage 1a. In some cases, the cushioning portion 212 may be provided on an inner surface of any one of the pressing portions 211, 211.

Figure 4B:
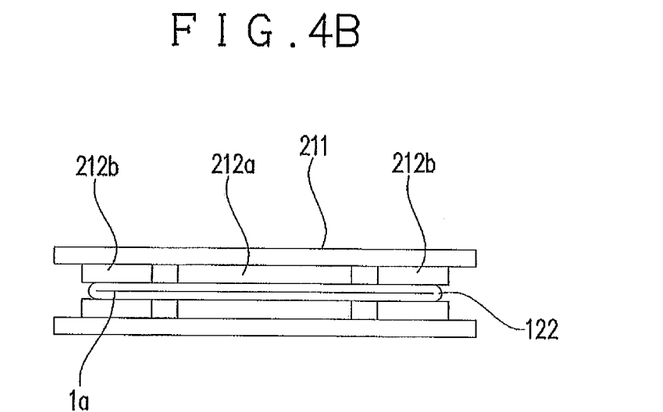
FIG. 4B shows a closed state.

In order to achieve close contact of the deformable portion 122 to close the passage 1a, as shown in FIG. 4(B), the end of the passage 1a needs to be deformed to be folded. Thus, in order to fully close the passage 1a, a pressing force at the end of the passage 1a needs to be larger than a pressing force at a center portion of the passage 1a. Thus, in this embodiment, a cushioning portion 212a closer to the center portion in an extending direction of the pressing portions 211, 211 has higher elasticity than cushioning portions 212b closer to opposite ends. In other words, the cushioning portion 212a closer to the center portion is softer than the cushioning portions 212b closer to the opposite ends. In this embodiment, the cushioning portion 212a closer to the center portion is made of sponge, and the cushioning portions 212b closer to the opposite ends are made of rubber. Thus, a larger pressing force can be applied to the ends of the passage 1a in a state as shown in FIG. 4(B), thereby reliably closing the passage 1a. In this embodiment, in order to provide a balance of pressing forces, the cushioning portion 212a closer to the center portion is thicker than the cushioning portions 212b closer to the opposite ends. Thus, the cushioning portion 212a closer to the center portion first presses the center portion of the deformable portion 122, and then a little late, the cushioning portions 212b closer to the opposite ends press the opposite end portions of the deformable portion 122. Thus, the passage 1a can be reliably closed without uneven close contact.

The pressing portion 211 of each of the opening and closing operation portions 21, 21 in this embodiment includes the hanging portion 213 formed integrally therewith to protrude upward. As shown in FIGS. 2 and 3, the hanging portion 213 is inserted into the pocket-shaped lock portion 123 provided in the nozzle 12. When the pressing portion 211 is moved in a direction away from the deformable portion 122, the hanging portion 213 moves the deformable portion 122 in a direction of opening the passage 1a. This can reliably open the passage 1a. The passage 1a may be naturally opened by elasticity of the deformable portion 122 itself without using the hanging portion 213.

—Hopper Holder or the Like—

As shown in FIG. 2, in this embodiment, the hopper 1 is held in a hopper holder 31 having a frame shape. The hopper holder 31 is provided at a portion between the upper end and the lower end of the hopper 1. The hopper holder 31 includes a securing clip 311. The holder mounting portion 113 of the hopper 1 can be held by the securing clip 311 to hold the hopper 1 in the hopper holder 31. The hopper holder 31 is supported by a spring 33. In this embodiment, a coil spring is used as the spring 33, but not limited to this, various springs such as a leaf spring may be used.

—Vibrator—

The hopper holder 31 in this embodiment includes the vibrator 32 that vibrates the hopper 1. As shown in FIG. 2, the vibrator 32 is secured to the hopper holder 31 via a mounting portion 32a formed of a metal plate. As the vibrator 32 in this embodiment, a vibration motor having an eccentric weight mounted to a rotating shaft of the motor is used to generate vibration having constant amplitude and frequency. The vibrator 32 may be conventional means for generating an impact (intermittent vibration with changing amplitude and frequency) using a solenoid or the like. The vibrator 32 may be means for generating vibration using an electromagnet or the like.

As described above, the hopper holder 31 is supported by the spring 33, and thus the vibration generated by the vibrator 32 vibrates the hopper holder 31 and thus vibrates the hopper 1. As described above, the hopper 1 is made of rubber, and the flat plate portion 112 has lower rigidity than the frame 111. Thus, the vibration can ripple the inner surface of the flat plate portion 112 in the entire hopper 1 to effectively shake off a remaining medicine.

The invention claimed is:

1. A medicine supply apparatus comprising:
   a) A hopper having a passage for passing a medicine downward, and the hopper is formed without a step in an inner surface,
   b) wherein a part of a lower portion of the hopper is a deformable portion having elasticity and the deformable portion is resiliently deformable so as to open and close the passage, and wherein a lock portion is secured to the outer surface on opposing sides of the deformable portion,
   c) the medicine supply apparatus further comprises an opening and closing portion that deforms the deformable portion to open and close the passage,
   d) the hopper has a lower end that is an output port for taking out the medicine, the lower end being located inside an envelope defined by a center-folded packing paper for packing the medicine, and
   e) the opening and closing portion is disposed outside the hopper and provided at a portion close to the lower end of the hopper so as to be located outside but close to the envelope of the packing paper and wherein the opening and closing portion comprises a pair of opposing driven opening and closing operation portions each with a pressing portion that moves close to the other pressing portion to depress the deformable portion, wherein each opposing driven opening and closing operation portion has a hanging portion extending therefrom and wherein each hanging portion is in engagement with the lock portion.

2. The medicine supply apparatus according to claim 1, wherein a portion facing the deformable portion of at least one of the pair of pressing portions is elastic.

3. The medicine supply apparatus according to claim 2, wherein each of the pair of pressing portions extends in a direction crossing a vertical direction so as to cross the deformable portion, and
   a portion in the elastic portion closer to a center portion in a vertical direction of the pressing portion is more elastic than a portion in the elastic portion closer to at least one of the opposite ends.

4. The medicine supply apparatus according to claim 1, further comprising a hopper holder that holds the hopper, wherein the hopper holder includes a vibrator that vibrates the hopper.

5. The medicine supply apparatus according to claim 1, wherein each pressing portion is provided in parallel with the lateral side of the packing paper.

6. The medicine supply apparatus according to claim 1, wherein the pressing portions of the pair of opposing driven opening and closing operation portions each move close to the other pressing portion to depress the deformable portion to transition the passage from opened to fully closed.

7. A medicine supply apparatus comprising:
   a) a hopper having a passage for passing a medicine downward, and the hopper is formed without a step in an inner surface,
   b) wherein the passage of the hopper is configured so that the medicine is taken out therethrough and dropped on a packing paper for packing the medicine, wherein the packing paper is center-folded and defines a packing paper envelope,
   c) at least a part of a nozzle, which is a lower portion of the hopper, is a deformable portion having elasticity, the deformable portion being resiliently deformable so as to open and close the passage, wherein a lock portion is secured to the outer surface on opposing sides of the deformable portion,
   d) the medicine supply apparatus further comprising an opening and closing portion that deforms the deformable portion to open and close the passage,
   e) wherein the nozzle has a lower end that is an output port for taking out the medicine, the lower end being located inside the packing paper envelope, and a predetermined portion of the nozzle, which is located above the lower end of the nozzle, outside but close to the packing paper envelope, is the deformable portion, and
   f) the opening and closing portion is disposed outside the hopper and located at the predetermined portion of the nozzle and wherein the opening and closing portion comprises a pair of opposing driven opening and closing operation portions each with a pressing portion that moves close to the other pressing portion to depress the deformable portion, wherein each opposing driven opening and closing portion has a hanging portion extending therefrom and wherein each hanging portion is in engagement with the lock portion.

8. The medicine supply apparatus according to claim 7, wherein a portion facing the deformable portion of at least one of the pair of pressing portions is elastic.

9. The medicine supply apparatus according to claim 8, wherein each of the pair of pressing portions extends in a direction crossing a vertical direction so as to cross the deformable portion, and
   a portion in the elastic portion closer to a center portion in a vertical direction of the pressing portion is more elastic than a portion in the elastic portion closer to at least one of the opposite ends.

10. The medicine supply apparatus according to claim 7, further comprising a hopper holder that holds the hopper, wherein the hopper holder includes a vibrator that vibrates the hopper.

11. The medicine supply apparatus according to claim 7, wherein each pressing portion is provided in parallel with the lateral side of the packing paper.

12. The medicine supply apparatus according to claim 7, wherein the pressing portions of the pair of opposing driven opening and closing operation portions each move close to the other pressing portion to depress the deformable portion to transition the passage from opened to fully closed.

* * * * *